United States Patent [19]
Klebl et al.

[11] Patent Number: 5,705,790
[45] Date of Patent: Jan. 6, 1998

[54] METHOD OF IGNITING A WELDING ARC

[75] Inventors: Wolfram Klebl, Isernhagen; Günter Titze, Langenhagen, both of Germany

[73] Assignee: Alcatel Kabel AG & Co, Germany

[21] Appl. No.: 673,721

[22] Filed: Jun. 27, 1996

[30] Foreign Application Priority Data

Jul. 11, 1995 [DE] Germany .................. 195 25 191.1

[51] Int. Cl.⁶ .................................................. B23K 9/067
[52] U.S. Cl. .................................. 219/130.4; 219/137 PS
[58] Field of Search ......................... 219/130.4, 136, 219/137 PS, 74, 75

[56] References Cited

U.S. PATENT DOCUMENTS

| | | | |
|---|---|---|---|
| 2,871,336 | 1/1959 | Lobosco et al. | 219/74 |
| 2,892,072 | 6/1959 | Miller | 219/130.4 |
| 2,993,984 | 7/1961 | Sullivan | 219/130.4 |
| 3,051,829 | 8/1962 | Manz | 219/130.4 |
| 3,076,085 | 1/1963 | Sundstrom | 219/75 |
| 3,459,996 | 8/1969 | Adamson et al. | 219/130.4 |
| 3,576,442 | 4/1971 | Beaupre et al. | 219/130.4 |
| 3,646,310 | 2/1972 | Manethou . | |

FOREIGN PATENT DOCUMENTS

| | | |
|---|---|---|
| 0 033 312 | 8/1981 | European Pat. Off. . |
| 26 06 854 | 8/1977 | Germany . |
| 3523 866 | 1/1987 | Germany . |

OTHER PUBLICATIONS

Uniwema Instruction Manual article from Kabel und Metallwerke Gutehoffnungshütte AG, Apr. 1975 issue.

Welding Processes–Arc and Gas Welding and Cuting, Brazing and Soldering, Welding Handbook, Seventh Edition, vol. 2, 1978 by American Welding Society, Miami, Florida, W.H. Kearns, Editor, pp. 94–97.

*Primary Examiner*—Clifford C. Shaw
*Attorney, Agent, or Firm*—Ware, Fressola, Van der, Sluys & Adolphson LLP

[57] ABSTRACT

A method is indicated for igniting a welding arc between a fixed electrode and a metal workpiece to be welded, whereby a covering protective gas is supplied by a nozzle that extends into the welding area. Before a welding power source is switched on for the welding arc, an auxiliary arc supplied by an auxiliary power source is ignited, which ignites the welding arc after the welding power source is switched on. To better ionize the welding area and ensure the ignition of the auxiliary welding arc, a high-frequency electric arc is produced in the welding area between the nozzle and the workpiece by means of a pulse generator which produces high-frequency high-voltage pulses.

2 Claims, 1 Drawing Sheet

METHOD OF IGNITING A WELDING ARC

BACKGROUND OF THE INVENTION

1. Technical Field

The invention concerns a method of igniting a welding arc between a fixed electrode and a metal workpiece to be welded, whereby a covering protective gas is supplied by a nozzle that extends into the welding area, where before the power source supplying the welding arc is switched on, an auxiliary arc is ignited in the welding area, which is supplied by an auxiliary power source and ignites the welding arc after the welding power source has been switched on, and whereby a high-frequency arc is first produced by means of a pulse generator producing high-frequency high-voltage pulses, to ignite the auxiliary arc in the welding area.

Such a method is used to weld steel, copper or aluminum sheet metal, for example. A special area of application is the manufacture of tubes, which are formed from a lengthwise running metal strip. The lengthwise running edges of a metal strip formed in this manner, which abut against each other, are welded as they pass by. The tube produced in this manner can be used to carry fluids, or as a protective enclosure for cables as well. A fixed electrode, thus one that does not burn off, is used for the welding. The welding arc heats the edges of the strip to a melting condition. A beadless seam is therefore formed by the material of the metal strip itself. To prevent burn holes, the welding area is shielded by an inert protective gas, such as for example argon or helium, against oxygen in the air.

2. Description of the Prior Art

In a known method according to "UNIWEMA Instruction Manual" from Kabel und Metallwerke Gutehoffnungshütte AG, 4/1975 Issue, before the welding arc is ignited, an auxiliary arc is ignited between electrode and nozzle, or in the facing-away position between electrode and workpiece, which needs less current power to burn than the welding arc. The auxiliary arc preheats the electrode and the workpiece, so that no burn holes occur in the workpiece when the high-power welding arc is ignited. To ignite the auxiliary arc, the welding area under the protective gas is ionized with high-frequency high-voltage pulses. These are produced by a pulse generator located between the electrode and the workpiece. After the auxiliary arc is ignited, the thus produced high-frequency arc is turned off. This method was proven in practice. However, it requires an effective protection of the welding power source from the high-frequency high-voltage pulses, which can unfavorably influence the igniting conditions of the auxiliary arc.

SUMMARY OF THE INVENTION

An object of the present invention is to further develop the above described method, so that stable conditions are produced for the ignition of the auxiliary arc.

This object is fulfilled by the invention in that the pulse generator is connected to the nozzle on the one hand, and to the workpiece on the other, and the high-frequency arc is produced between these two parts.

It was surprisingly shown that by producing a high-frequency arc between the electrode and the nozzle, an improved ionization of the protective gas could be obtained in the welding area. This fact by itself already stabilizes the conditions for the ignition of the auxiliary arc. In addition, this method electrically separates the pulse generator and the welding power source, so that the measures for protecting the welding power source from the high-frequency high-voltage pulses can be omitted. This leads to a further improvement of the protective gas ionization, and thereby further stabilizes the conditions for ignition of the auxiliary arc.

The invention will be fully understood when reference is made to the following detailed description taken in conjunction with the accompanying drawing.

BRIEF DESCRIPTION OF THE DRAWING

The method of the invention will be explained with a configuration example by means of the drawing, where.

DETAILED DESCRIPTION OF THE INVENTION

Figure 1:
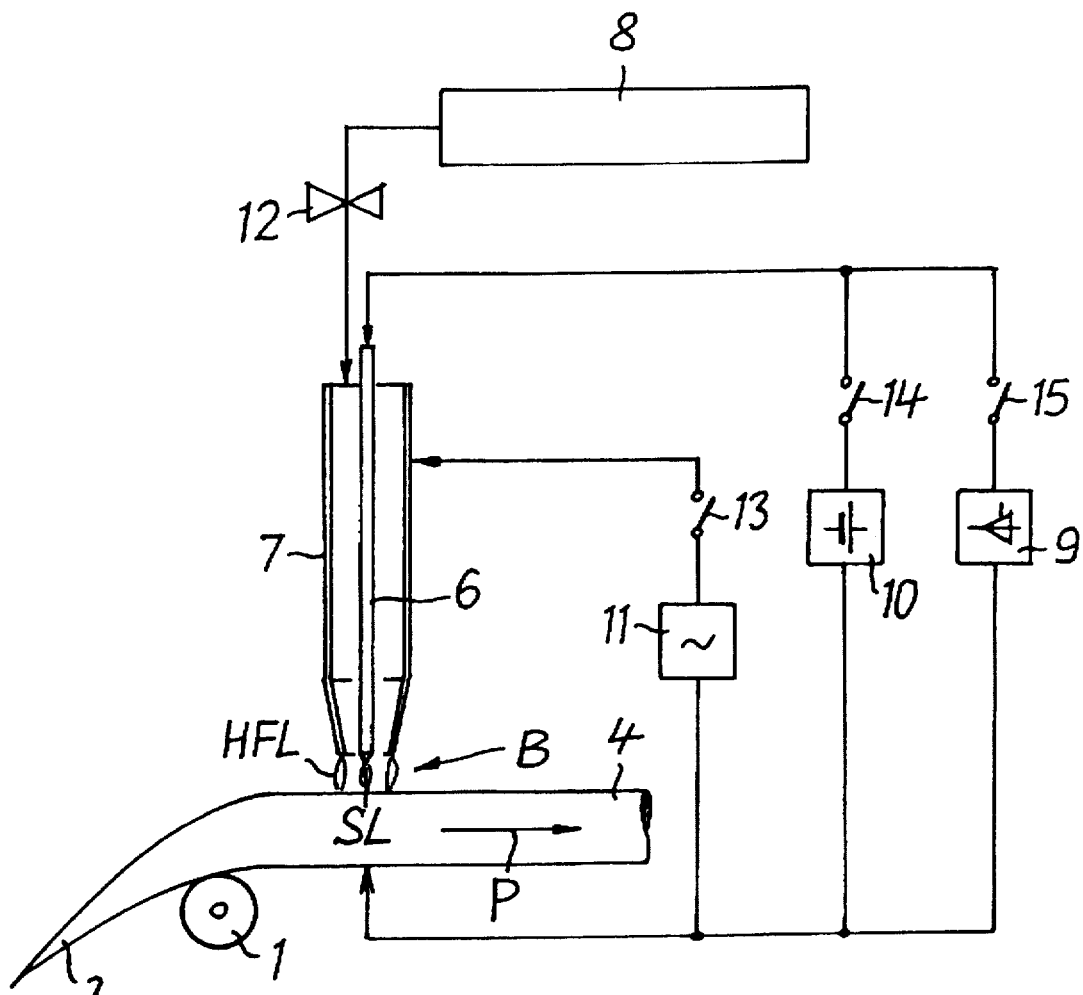
FIG. 1 is a schematic arrangement for carrying out the method of the invention.
Figure 2:
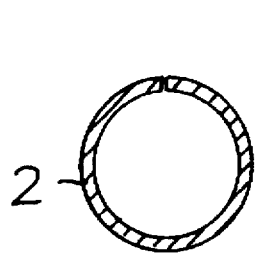
FIGS. 2 and 3 are two different cross sections of a tube being produced by the method.
Figure 3:
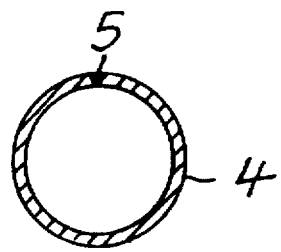

With the arrangement depicted in the drawing, a metal strip 3 is continuously formed into a slotted tube 2 (FIG. 2) as it passes by a forming tool 1 which is only schematically indicated. The lengthwise running, obtusely abutting edges of the slotted tube 2 are welded. The resulting welded workpiece (FIG. 3) is a closed tube 4 with a beadless welded seam 5.

The arrangement for welding the slotted tube 2 contains a fixed electrode 6, thus one that does not burn off, made of tungsten, for example. The electrode 6 is located in a tube-shaped nozzle 7, made of steel, copper or brass for example, which is connected to a gas-filled container 8. In addition, the arrangement includes a welding power source 9, an auxiliary power source 10, and a pulse generator 11. Like the auxiliary power source 10, the welding power source 9, which supplies the welding arc, is connected to the electrode 6 and the metal strip 3 or the tube 4. The pulse generator 11 is connected to the nozzle 7 and the metal strip 3 or the tube 4.

The container 8 contains an inert gas, for example argon or helium. The current delivered by the welding power source 9 is significantly higher than the one coming from the auxiliary power source 10. The pulse generator 11 produces high-frequency high-voltage pulses.

The method of the invention works for example as follows:

After the valve 12 is opened, gas flows into the nozzle 7 at a pressure of 1 bar for example, and at the rate of about 5 to 10 liters per minute. It flows around the electrode 6, particularly around the point that faces the tube 4. The gas shields the entire welding area B at the point of electrode 6, and the surface of the tube 4, or the joined edges of the metal strip 3, against the oxygen in the surrounding air. The pulse generator 11 is then turned on by means of switch 13. The high-frequency high-voltage pulses of 6 volts at about 600 kHz for example, which are produced by the latter, ionize the gas in the welding area B. In addition, a high-frequency arc HFL is produced between the nozzle 7 and the tube 4.

As soon as the high-frequency arc HFL is burning, the auxiliary power source 10 is turned on by switch 14. The gas ionization and the high-frequency arc HFL cause an auxiliary arc to be ignited between the electrode 6 and the tube 4. It is supplied by the auxiliary power source 10 and burns at a relatively low current intensity of 5 to 7 amps for example, so that the electrode 6 and the adjacent edges of the slotted tube 2 are only heated. At that point, the high-frequency arc HFL is turned off by opening the switch 13.

The welding power source 9 is then turned on by means of switch 15, for welding the edges of the slotted tube 2. The welding arc SL is then ignited by the auxiliary arc. It burns with a current intensity of 350 amps, for example. The auxiliary power source 10 is turned off as soon as the welding arc SL is burning. At the same time, the tube 4 is drawn in the direction of arrow P and in this way moves continuously past the electrode 6. The preheating of the electrode 6 and the slotted tube 2 by the auxiliary arc ensures that no burn holes occur in the welded seam 5 or in the tube when the welding arc SL is used.

The preferred embodiment described above admirably achieves the objects of the invention. However, it will be appreciated that departures can be made by those skilled in the art without departing from the spirit and scope of the invention which is limited only by the following claims.

What is claimed is:

1. A method for igniting a welding arc, which comprises the steps of:

(a) providing a fixed electrode;

(b) providing a metal workpiece spaced from the fixed electrode whereby a welding area is defined between the metal workpiece and the fixed electrode;

(c) supplying a covering protective gas by a nozzle that surrounds the fixed electrode and extends into the welding area;

(d) producing a high-frequency arc in the welding area by a pulse generator delivering high-frequency high-voltage pulses, the pulse generator being connected to the nozzle and the workpiece whereby the high-frequency arc is produced between the nozzle and the workpiece; and (e) prior to switching on a welding power source which supplies the welding arc, producing an auxiliary arc, the auxiliary arc being ignited by the high-frequency arc, the auxiliary arc being supplied by an auxiliary power source connected between the metal workpiece and the fixed electrode.

2. A method in accordance with claim 1, further including the step of switching on the welding power source connected between the metal workpiece and the fixed electrode and igniting the welding arc by the auxiliary arc.

* * * * *